United States Patent

Steitz, Jr.

[15] 3,699,160
[45] Oct. 17, 1972

[54] PURIFICATION OF PHENYLINDANE CARBOXYLIC ACIDS BY PERMANGANATE TREATMENT OF THE SODIUM SALTS

[72] Inventor: Alfred Steitz, Jr., Flossmoor, Ill.
[73] Assignee: The Standard Oil Company, Chicago, Ill.
[22] Filed: March 27, 1968
[21] Appl. No.: 716,335

[52] U.S. Cl. ............................................. 260/525
[51] Int. Cl. ........................................... C07c 51/42
[58] Field of Search ................................... 260/525

[56] References Cited

UNITED STATES PATENTS

| | | | |
|---|---|---|---|
| 3,047,621 | 7/1962 | Tate | 260/524 |
| 1,692,927 | 11/1928 | Calcott et al. | 260/525 |
| 2,744,938 | 5/1956 | Urban | 260/525 |
| 2,905,708 | 9/1959 | Peterson et al. | 260/525 |
| 3,410,897 | 11/1968 | Shigeyasu et al. | 260/525 |

OTHER PUBLICATIONS

Laitenen, Chemical Analysis, 1960, p. 280.

Primary Examiner—Lorraine A. Weinberger
Assistant Examiner—R. S. Weissberg
Attorney—Arthur G. Gilkes, William T. McClain and Fred R. Ahlers

[57] ABSTRACT

Phenylindane carboxylic acids are purified by low concentration permanganate treatment at pH upward from 10 and carbon treatment to remove at least manganous ions. The process is particularly useful for the purification of phenylindane dicarboxylic acids that are to be converted to the beta hydroxy alkyl esters from which corresponding film and fiber forming polyesters are made.

5 Claims, No Drawings

PURIFICATION OF PHENYLINDANE CARBOXYLIC ACIDS BY PERMANGANATE TREATMENT OF THE SODIUM SALTS

BACKGROUND OF INVENTION

Purification of aromatic polycarboxylic acids has become increasingly more important in recent years because these aromatic acids are the building blocks of many synthetic polyester fibers and films whose manufacture requires starting materials free from impurities, so that the polyester product has suitable strength, tenacity and appearance. Previous investigators have suggested purification of aromatic polycarboxylic acids through the use of techniques such as sublimation, recrystallization, adsorbtion and attack of impurities through oxidation and/or reduction as well as combinations thereof. Some of these techniques are limited in their application. For example, the sublimation process is useful only when the impurities and acids do not vaporize or sublime at the same temperature. Recrystallization is useful only when impurities and acids are reasonably soluble and have different solubility characteristics. Adsorption is limited to the extraction of impurities that are adsorbed preferentially over the product. Not all of the impurities are reducible. Oxidation attack with such oxidizers as permanganates and hypohalites have been proposed. Hypohalites tend to halogenate phenylindane carboxylic acids. The permanganate level of treatment commonly taught, for example, in U.S. Pat. No. 3,047,621 is 3 percent concentration based on the weight of the crude acid to be purified. Permanganates in this concentration are not effective in removing the catalysts carried over from production such as bromine in the case of phenylindane carboxylic acids.

SUMMARY OF INVENTION

The invention is the process of treating an alkaline solution of the alkali metal or ammonium salt of the aromatic acid containing impurities having bromide, aldehyde and keto groups, with permanganates in a concentration of about 0.75 percent to about 1.5 percent $MnO_4$ ion based on the weight of crude acid to be treated, removing the manganese dioxide resulting from oxidation of the aldehyde and ketone impurities by the permanganate by filtration, and treating the solution with carbon. Permanganates added in such amounts at a temperature between about room temperature (70°F.) and reflux temperature (212°F.) selectively oxidize aldehyde functions attached to the aryl ring portions of the molecule without oxidizing the other carbon groups or splitting the carbon ring. The permanganates also have the unexpected effect of removing bromine which is present as a catalyst in the preparation of phenylindane carboxylic acids and is carried over as a contaminant of the product. The process is general and may be applied to alkali metal salts and ammonium salts of any aromatic acid. It is particularly applicable to aromatic acids which have a high level of aldehyde and ketone impurities not absorbed by carbon and which cannot be treated with other oxidizing agents such as hypochlorite solution (risk of chlorinating the acid). The process is particularly applicable to phenylindane dicarboxylic acid since the aldehyde and ketones are not completely removed by carbon, even in heavy treatments, and it is more readily chlorinated then terephthalic acid. The process has the distinct advantages of: (1) whitening the acid, i.e., removing bromine used as a radical promoter in the acid preparation, (2) oxidizing the aldehyde and ketone groups to acid, (3) by preferentially attacking the carbon atoms other than those in the ring structures. As an end result the purified acids are whiter and more commercially desirable and the resulting synthetic compounds are free from voids caused by terminal aldehyde groups.

It is also possible to use compounds such as $Na_2CO_3$, and $NaHCO_3$, $Na_2O_3$ and $K_2CO_3$, $KHCO_3$ and other salts of sodium, potassium and ammonium to form the salts of PIDA and selected acids of the invention.

PREFERRED EMBODIMENTS

The preferred acid is 1,1,3-trimethyl-3-(p-carboxyl phenyl)-5-carboxy-indan (PIDA). The purification of PIDA can be carried out at near reflux conditions to speed the process since at 1 to 1½ percent potassium permanganate concentration the treatment time is 48 hours at room temperature, decreasing at reflux to a treatment time of 1 to 1½ hours. The preferred pressure is atmospheric pressure. The permanganate is added either to the molar aqueous sodium salt solution as prepared, or to a heated or refluxing solution. The potassium permanganate appears to be completely reduced under these conditions, but a carbon treatment after the permanganate treatment may be desirable to ensure complete manganese removal. Carbon quantitatively reduces excess permanganate and apparently absorbs the reduced ion or manganese dioxide. Addition of carbon is not necessary; however, it may be desirable where there remain impurities coloring the acid or traces of permanganate in solution. It has also been found advantageous to control the pH during the several steps of the process. The permanganate treatment, if performed at a high pH (upward from 10), is more efficient since a high pH increases the solubility of the acids allowing more complete oxidation of their undesirable aldehyde and ketone functions. The carbon treatment should be carried out at a pH of about 7, preventing any base soluble impurities from desorbing off the carbon and again contaminating the product. The alkali metal salts or ammonium salt, if acidified to obtain free acid at high temperatures (80°C.) and low pH (about 4), facilitates free acid recovery by filtration by ensuring large particle size. The process may be illustrated by the following example:

1. Sodium hydroxide (16.4 gms) was added to 600 ml of water and heated to 210°F., the solution had a pH greater than 10. (pH PIDA and potassium permanganate were added and the solution was stirred until all of the potassium permanganate had reacted (indicated by the absence of purple color in the solution). The required reaction time ranged between 1 hour and 4½ hours depending upon the amount of potassium permanganate added. The solution was filtered and the pH adjusted to 7–8. Carbon (1.2 gms) was added to the filtrate which was heated to 150°–175°F. for one hour. The carbon was then removed and the PIDA was regenerated (pH2–4) with 6N. sulfuric acid at 80°C. The acid precipitate was recovered and reslurried twice in hot water. The colors of the purified acids were observed and recorded according to three separate procedures: the sulfuric acid method, the N,N-dimethylformamide method and the triethylene glycol method. In the sulfuric acid method, a purified acid sample is dissolved in concentrated sulfuric acid(98 percent $H_2SO_4$) and the color is matched with American Public Health Association (APHA) color standards. In the N,N-dimethylformamide (DMF) method, a purified acid sample is dissolved in (DMF); the color and insolubles are observed and matched with APHA color standards. In the triethylene glycol method, the purified acid is reacted with a 300 percent molar excess of triethylene glycol for 90 minutes at 260°C., producing a solution whose color is matched instrumentally with APHA color standards. Numbers in the range of 20 indicate essentially clear solutions, while numbers in the range of 500–510 indicate deep yellow solutions, thus the higher the number the less desirable the product.

Permanganate Treating Time At 1 Hour

| Sample Treatment | TEG | Color Tests $H_2SO_4$ | DMF | Br ppm |
|---|---|---|---|---|
| Feed, Average | 710 | 1500+ | 500–600 | 157 |
| Blank, no $KMnO_4$+C | 520 | 500–595 | 70–80 | 96 |
| 0.1% $KMnO_4$ or 0.075% $MnO_4^-$ | 710 | 500–595 | 70–80 | 61 |
| 0.5% $KMnO_4$ or 0.376% $MnO_4^-$ | 430 | 600–700 | 60–70 | 45 |
| 1.0% $KMnO_4$ or .754% $MnO_4^-$ | 270 | 350–400 | 20–25 | 17 |
| 1.5% $KMnO_4$ or 1.130% $MnO_4^-$ | 230 | 250–300 | 15–20 | 17 |

Permanganate Treating Time At 1½ Hours

| 1.0% $KMnO_4$ | 350 | 400–450 | 35–40 | 42 |
| 1.5% $KMnO_4$ | 150 | 200–250 | 10–15 | 24 |

Permanganate Treating Time At 2 Hours

| 2.0% $KMnO_4$ or 1.508% $MnO_4^-$ | 190 | 200–250 | 15–20 | 13 |

Permanganate Treating Time At 4½ Hours

| 3.0% $KMnO_4$ or 2.260% $MnO_4^-$ | 190 | 200–250 | 15–20 | 20 |

Note: Numbers above the upper limit of the APHA table, 500, were obtained by extrapolation
In the above table, treating time is the time required for the complete disappearance of purple color indicating complete reaction of potassium permanganate The table shows that as the concentration of permanganate is increased, the product becomes more desirable because it is more pure. The table also shows that there is an optimum amount of permanganate which should be added to a sample of crude acid to get the best results in a given time period. Crude acid treated for 1 hour with 1 percent $KMnO_4$ is more pure than crude acid treated for 1½ hours. This can be explained by the fact that prolonged heating at these temperatures forms some of the same impurities that are being eliminated by the $KMnO_4$, thus at the point when the $KMnO_4$ is entirely consumed impurities accumulate in the acid undergoing purification. As the concentration of the $KMnO_4$ is increased to 1½ percent the allowable purification time period increases to 1½ hours. After 1 hour with 1½ percent $KMnO_4$ the crude acid is more pure than after 1 hour with 1 percent $KMnO_4$. This is probably because the reaction is driven further to completion by the high concentration of one of the reactants. The 1½ percent $KMnO_4$ gives better results after a longer period of time, which is probably due to the fact that the rate of the completing reaction is not concentration controlled. It is very important that the purification process be stopped immediately after the last visual traces (purple color) of $KMnO_4$ disappear since aldehyde and ketone impurities will be continuously formed without any $KMnO_4$ present to convert them to the acid. The concentration of 2 percent $KMnO_4$ for 2½ hours and 4 percent $KMnO_4$ for 4½ hours shows that in both cases the reaction time was too long; the reaction time for maximum purification should be somewhat less than 2½ and 4½ hours respectively. The data also show that increasing the reaction time and concentration is not effective after this point. A definite molar ratio of $KMnO_4$ to impurities cannot be formulated, since the original concentration of impurities is so small. Accurate detection of impurities in the crude acid cannot be made during the purification process because trace amounts of additional impurities are continuously formed and oxidized to the acid salt.

The above example showing purification of dicarboxyphenylindanes is in no way intended to limit the scope of the invention. The discovered process can be used to purify mono, tri and tetra carboxyphenylindanes as well as dicarboxyphenylindanes.

I claim:

1. A process of treating at a temperature between about 70°F. and 212°F. an alkaline aqueous solution having a pH upward from 10 of the alkali metal or ammonium salt of a phenylindanecarboxylic acid which has been produced in the presence of bromine as catalytic component and which contains salts of aldehydo- and keto- compounds, bromine and other impurities, with about 0.75 to about 1.5 percent permanganate ion ($MnO_4-$) based on the weight of crude acid to be treated only until the last visual trace of purple color disappears, removing the manganese dioxide by-product resulting from the permanganate, adjusting the pH of the treated solution to 7, contacting the treated solution with carbon and recovering the purified acid from its salt by acidifying the resulting solution with an acid having an ionization constant greater than that of the phenylindanecarboxylic acid to be purified.

2. The process of claim 1 wherein the acids to be purified are selected from the group consisting of 1,1,3-trimethyl-3-(p-carboxy-phenyl)-5-carboxyindan, 1,1,3-trimethyl-3-(m-carboxyphenyl)-6-carboxy-indan, and 1,1,3-trimethyl-3-(m-carboxyphenyl)-4-carboxyindan.

3. The process of claim 1 wherein the aqueous alkaline solution at which the crude acid is added is selected from the group consisting of sodium, potassium and ammonium hydroxides.

4. The process of claim 1 wherein the permanganate ions are supplied by addition of permanganate compounds selected from the group consisting of $NaMnO_4$, $LiMnO_4$, $KMnO_4$, $CsMnO_4$, and $NH_4MnO_4$.

5. The process of claim 1 wherein the permanganate ions are supplied by addition of $KMnO_4$.

* * * * *